May 3, 1932. E. W. DOLAMORE 1,856,948
ASSEMBLING DEVICE
Filed June 23, 1930
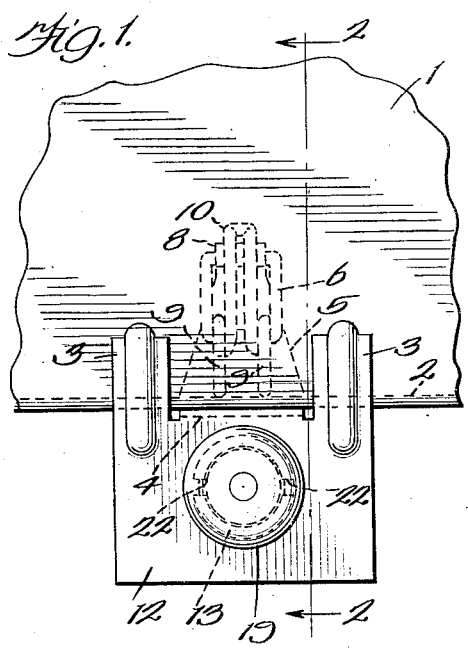
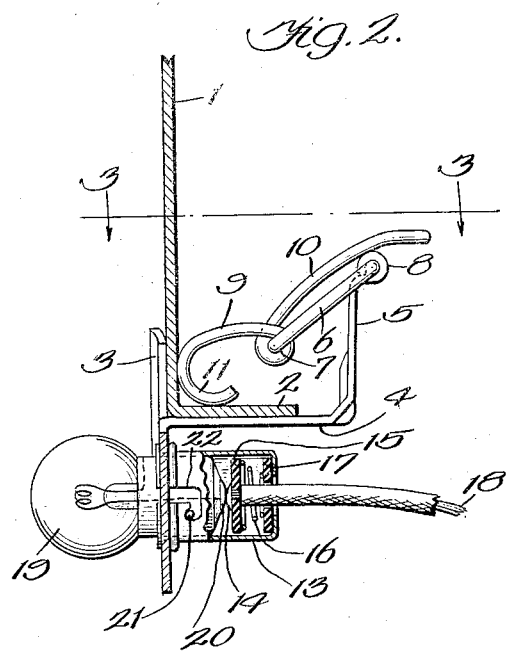
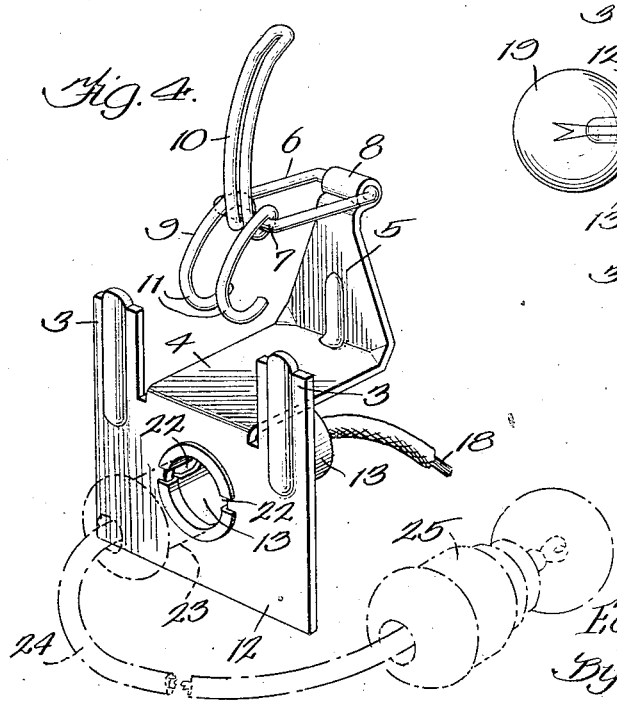
Inventor:
Earl W. Dolamore
By G. L. Cragg Atty Patented May 3, 1932

1,856,948

UNITED STATES PATENT OFFICE

EARL W. DOLAMORE, OF BRONSON, MICHIGAN, ASSIGNOR TO HARRY A. DOUGLAS, OF BRONSON, MICHIGAN

ASSEMBLING DEVICE

Application filed June 23, 1930. Serial No. 463,342.

My invention relates to assembling devices and in one aspect thereof is inclusive of one member in the form of a bracket having two fingers spaced apart to receive an object therebetween and a second member in the form of an object clamping lever swingingly mounted upon one of said fingers and projecting toward the other finger to engage the object that is interposed between the fingers and clamp it against the latter finger. One of the aforesaid members of the assembling device is desirably of spring formation, whereby spring clamping pressure may be exerted upon the object that is to be held between the fingers of the bracket. This is especially desirable if the object itself does not possess the necessary resilience to furnish the desired clamping pressure. The clamping member which furnishes the spring pressure is desirably the bracket itself which, to this end, is preferably made of resilient sheet metal. The clamping lever is desirably a toggle lever mounted at one end to turn upon the bracket finger that carries the lever and having its elbow disposed between the fingers and its unmounted end adjacent the opposite side of the bracket to be engageable with the object with which the bracket is to be assembled. The bracket is desirably of U shape whose sides constitute the fingers between which the object is to be received.

In another aspect the invention is inclusive of a U shaped bracket and a clamping member, preferably the aforesaid toggle lever, mounted upon one side of the bracket and extending diagonally toward the other side of the bracket and the bracket base. A bracket thus constructed is well adapted for assembly with an automotive vehicle dash board which usually has a ledge margining its bottom edge. The bracket may be positioned to enable the obliquely disposed clamping member or lever to press the base of the bracket upwardly against said ledge and to press the bracket side, toward which the lever obliquely projects, against the front of the dash board. The bracket is desirably provided with a depending apron which may be used for carrying various devices as, for example, a socket for the reception of a small incandescent lamp or for the reception of a plug from which a cord leads to an inspection incandescent lamp, though obviously the structure may serve a large variety of purposes.

The invention will be more fully explained in connection with the accompanying drawings, in which Fig. 1 is a view, in elevation, illustrating a portion of an automotive vehicle dash board with the assembling device of my invention detachably applied thereto; Fig. 2 is a sectional view on line 2—2 of Fig. 1; Fig. 3 is a sectional view on line 3—3 of Fig. 2; and Fig. 4 is a perspective view of the device showing in conjunction therewith a plug receiving socket that contains a plug pertaining to an inspection lamp which is shown as being connected with the plug by a cord.

As my invention was initially designed for use in conjunction with an automotive vehicle dash board, I have illustrated such a dash board which is inclusive of an upright body portion 1 and a ledge 2 margining the bottom of the board. The assembling device in the embodiment of the invention illustrated is inclusive of a generally U-shaped bracket, as viewed in Fig. 2, one of the bracket sides being divided into two fingers 3 from which the bracket base 4 extends to the single finger 5 constituting the other side of the bracket. This bracket constitutes one member of the assembling device, a second member of the assembling device being preferably in the nature of a toggle lever having one of its sections 6 pivoted to the upper end of the finger 5, the elbow 7 of the lever intervening between the finger 5 and the fingers 3, and overlying the bracket base 4. The lever section 6 is desirably made of wire folded into a rectangle with one of the rectangle sides encircled by the eye 8 that is formed in the upper end of the finger 5, thereby constituting a bearing for said lever section. The other section 9 of the toggle lever is desirably also formed of wire which is wrapped about the side of the section 6 opposite said eye. The wire of which the lever section 9 is made may be also inclusive of a handle 10 in one piece with section 9, this handle being provided for conveniently manipulating the lever and which, if so desired, may be so proportioned as just to engage the eye 8 when the lever is in full clamping adjustment and when the device is designed for one special use. In applying the device to the dash board, the bracket is disposed with its base 4 beneath and engaging the bottom face of the ledge 2 and with the fingers 3 engaging the front face of the body 1 of the dash board. The lever is inclined toward the corner of the bracket defined by the bracket base 4 and the fingers 3, the dash board or object engaging end of the lever being curled, as indicated at 11, and entering the corner defined by the dash board body 1 and ledge 2. By pressing the handle 10 downwardly, the lever end 11 is forced against both the dash board body 1 and ledge 2 to cause the bracket base 4 to press tightly upward against the bottom of the ledge and to cause the fingers 3 to press firmly against the front of the board. If for any reason the clamping pressure against the body should be excessive, the handle 10, by engaging the eye 8, will prevent dislocation of the lever elbow from its clamping position. One of the mounting members is made of spring material, preferably the bracket, the two sections of the lever being each desirably substantially rigid. The dimensions of the bracket are such that the spring finger 5 will be pressed sufficiently away from the dash board when the elbow of the lever is placed in its final position. Where the device is designed particularly for use in conjunction with dash boards of the construction illustrated, the handle 10 may engage the eye 8 when the elbow of the lever has been put in position in which the spring finger 5 is so far pressed away from the dash board by the lever that said finger will exert the necessary spring clamping pressure on the lever to cause the bracket to be firmly assembled with the dash board.

The bracket is desirably provided with a depending apron 12 which continues from the bracket base and extends oppositely to the fingers. This apron, in effect, constitutes a detachably applied downward extension of the dash board for the purpose of mounting objects upon the dash board without altering the dash board construction. I have illustrated a single pole metallic socket 13 whose forward end passes through said apron and is suitably clinched into assembly therewith, this socket being grounded through the bracket and the dash board which is also usually of metal. The metallic lever also contributes to the grounding of said socket. A floating forwardly spring pressed contact 14 is provided within the socket and is carried upon an insulating disc 15 which is pressed upon forwardly by a coiled spring 16. This spring is insulated from the socket by said disc 15 and also by an insulating washer 17 at the inner end of the socket. A flexible insulated conductor 18 extends through the washer 17 and disc 15 into electrical connection with the contact 14. In Figs. 1, 2 and 3 I have illustrated an incandescent lamp 19 having one terminal of its filament electrically connected with the metallic sheath of the lamp base and the other terminal of its filament electrically connected with the contact 20 which is upon the rear face of the lamp base to be engageable by the contact 14. Metallic bayonet pins 21 are receivable within suitable bayonet slots 22 in the socket, whereby the sheath of the lamp base and the filament terminal that is connected with the sheath of the lamp base are grounded. In Fig. 4, the socket is shown as containing a circuit continuing plug 23, from which a flexible cord 24 extends to an inspection lamp 25.

Changes may be made without departing from the invention.

Having thus described my invention, I claim:

1. An assembling device including one member in the form of a bracket having two fingers spaced apart to receive an object therebetween and a second member in the form of an object clamping lever swingingly mounted upon one of said fingers and projecting toward the other finger to engage the object that is interposed between the fingers and clamp it against the latter finger, wherein the clamping lever is a toggle lever mounted at one end to turn upon the finger that carries the lever and having its elbow between the fingers and its unmounted end movable toward and from the other finger whereby the object may be clamped between the latter lever end and the latter finger.

2. An assembling device including one member in the form of a bracket having two fingers spaced apart to receive an object therebetween and a second member in the form of an object clamping lever swingingly mounted upon one of said fingers and projecting toward the other finger to engage the object that is interposed between the fingers and clamp it against the latter finger, wherein the clamping lever is a toggle lever mounted at one end to turn upon the finger that carries the lever and having its elbow between the fingers and its unmounted end movable toward and from the other finger whereby the object may be clamped between the latter lever end and the latter finger and wherein one of the members is of spring formation to exert clamping spring pressure upon the object.

3. An assembling device including a U shaped spring metal bracket for receiving an object between its sides; a base on said bracket for contacting with the object; a spring metal clamping member carried by one of the bracket sides for clamping the object against the base and the other bracket side; and an apron continuing from the bracket base oppositely to the fingers and from which said other bracket side directly extends.

4. Assembling means including in combination an angular object, a U-shaped bracket whose sides constitute fingers between which the object may be received, a base integral with the sides and contacting with one angular portion of the object, and a clamping member carried upon one side of the bracket and extending diagonally toward the other side of the bracket and the bracket base and contacting with both angular portions of the object.

In witness whereof I hereunto subscribe my name.

EARL W. DOLAMORE.